E. C. FOLSOM.
CAR LIGHTING SYSTEM.
APPLICATION FILED APR. 16, 1908.
932,114.
Patented Aug. 24, 1909.
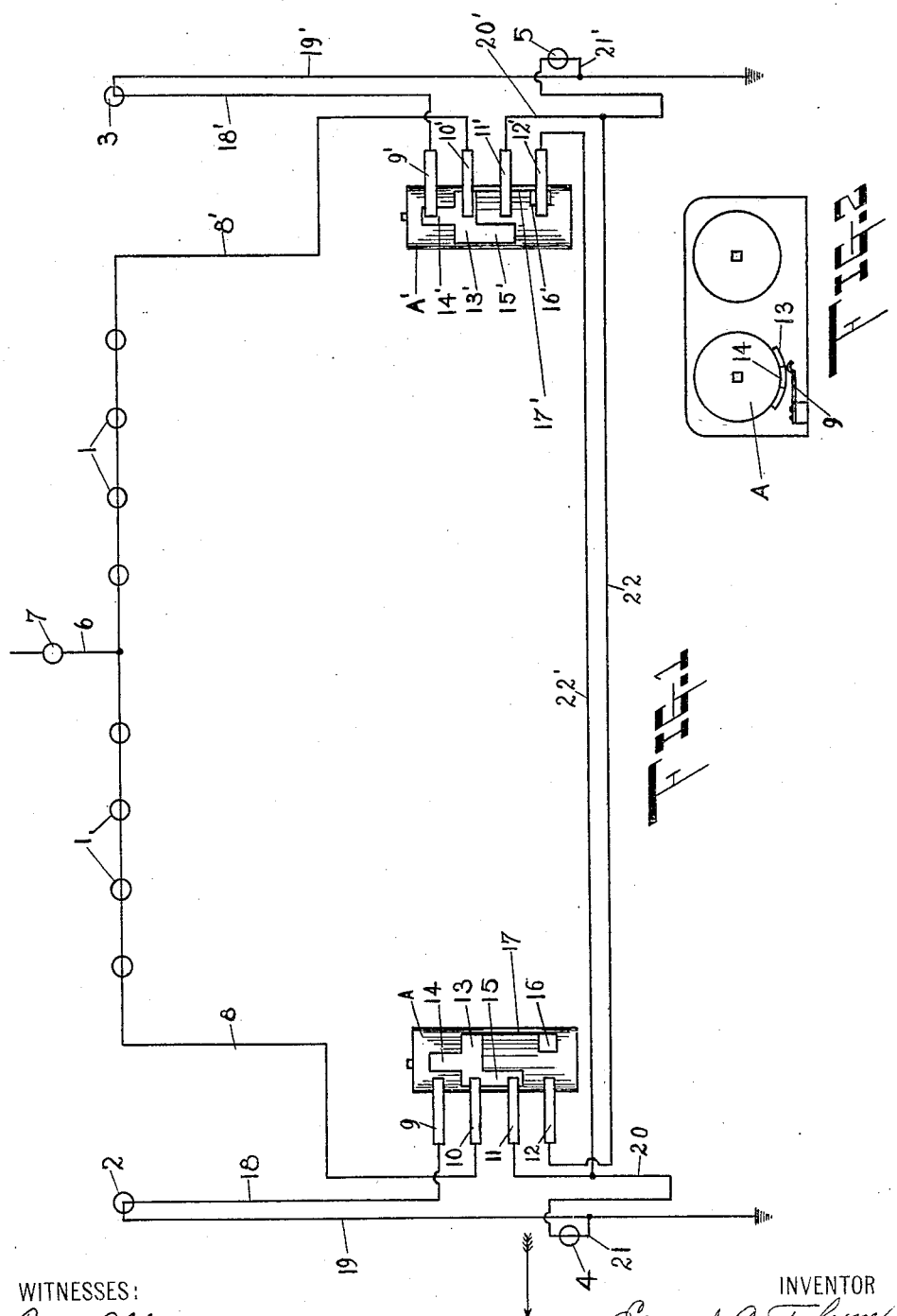
WITNESSES:
J. Ray Abbey
Ralph S. Warfield
INVENTOR
Edward C. Folsom
BY
Geo. B. Willcox
ATTORNEY

UNITED STATES PATENT OFFICE.

EDWARD C. FOLSOM, OF SAGINAW, MICHIGAN.

CAR-LIGHTING SYSTEM.

932,114.   Specification of Letters Patent.   Patented Aug. 24, 1909.

Application filed April 16, 1908. Serial No. 427,395.

*To all whom it may concern:*

Be it known that I, EDWARD C. FOLSOM, a citizen of the United States, residing at Saginaw, in the county of Saginaw and State of Michigan, have invented certain new and useful Improvements in Car-Lighting Systems; and I do hereby declare the following to be a full, clear, and exact description of the invention, such as will enable others skilled in the art to which it appertains to make and use the same.

My invention relates to electric lighting systems, and more particularly to car lighting systems.

In the following specification I have shown and described my invention as applied to street and interurban cars but the invention is applicable to other uses as well.

Heretofore car lighting circuits have been so arranged that the insertion of a headlight in its socket completes the circuit and lights the car lamps as well as the headlight. Several disadvantages pertain to this arrangement. The motorman when at the end of the line must move his headlight from end to end of the car during which time the car is in darkness. Furthermore, in reversing the current to back the car, no headlight is automatically displayed on the rear end of the car as a warning to following cars on the line. Again it requires a special wiring for the platform lights which wiring, it is assumed will shunt the current around and not through the front platform light. The foregoing arrangement does not give the motorman an automatic control of the headlight and platform light circuits. Another arrangement shows a circuit wherein the current is led from its source directly to the contacts controlled by the movement of the reverse cylinder and thence to the lamps in the car. This is a step in advance of the former construction because the movement of the reverse cylinder to off position will extinguish the headlight at the front end of the car, whereas movement of the cylinder to its forward or backward position will not extinguish the headlight. The objections to this construction however are that the movement of the reverse cylinder to its backward position, to back the car, will not automatically send a circuit through the rear headlight, and furthermore, the current is led from the trolley wire, third rail or other source directly to the reverse cylinder and thence to the lamps in the car, the result being that movement of the cylinder is very liable to cause a short circuit between the contacts and burn out the lighting circuit. Furthermore, the lights in the car are extinguished from the time the motorman moves the reverse cylinder at one end of the car to off position until he moves the cylinder at the opposite end of the car to its forward position, as when the car is at the end of the line, for instance.

One object of my invention therefore, is to provide means whereby the headlight at the rear end of the car is automatically lighted when the reverse cylinder is moved to its rearward position to back the car.

Another object is to provide means whereby the car lamps remain lighted no matter what positions may be assumed by the reverse cylinders.

A further object is the provision of a circuit so arranged as to avoid any danger of short circuiting the lighting circuit when the reverse cylinder is operated.

Still another object is the provision of means attaining the foregoing ends which requires no additional action on the part of the motorman. In other words, the motorman in fulfilling his necessary duties automatically accomplishes the results desired.

A still further object is the automatic extinguishment of the vestibule or platform light at the forward end of the car when the headlight is lighted.

My invention further consists in certain novel features and combinations all of which will be more fully described hereinafter and particularly pointed out in the claims.

In the accompanying drawings Figure 1 is a diagrammatic view showing one form of my invention, Fig. 2 is a top plan view of the reverse cylinder showing the contacts.

(1), (1), indicate the interior car lamps located in any convenient manner, (2), (3) indicate the vestibule or platform lights and (4), (5), the headlights located at opposite ends of the car respectively.

The cement is led into the car by a supply wire (6) from any suitable source as an underground or overhead trolley or a third rail. A hand operated switch (7) may for convenience be interposed in the supply wire (6) if desired. The wire (6) is connected to a wire (8) intermediate its ends, the wire (8) supplying the interior lamps (1), (1), in the car with current.

A, A′, indicate the reverse cylinders at opposite ends of the car respectively. Conveniently located on each reverse cylinder and moving therewith are contact segments adapted to be engaged by the series of vertically arranged fingers (9), (10), (11), and (12) respectively, which fingers are preferably of even length. The segments may be of any desired construction, that shown consisting of a main contact segment (13) with which the finger (10) is constantly in engagement, and the sections (14), (15), and (16) adapted to be engaged by the fingers (9), (11), (12) respectively and arranged in successive arcs upon the periphery of the reverse cylinder in such a manner that when a circuit is closed through one of the fingers (9), (11) or (12) and its corresponding section (14), (15) or (16) the remaining circuits except the lamp-circuit will be open. Obviously any arrangement whereby the contact fingers and contacts are caused to successively make and break their respective circuits might be utilized. In the drawings the section (16) is connected with the main segment (13) by means of a buried or otherwise insulated connection (17). The opposite ends of the wire (8) supplying the lamp circuit terminate in the fingers (10), (10'), in constant engagement with the main contact segments (13), (13') at the opposite ends of the car and I shall call this circuit the lamp circuit.

A platform light circuit is energized through the lamp circuit and is arranged at each end of the car. Such circuit consists of the contact fingers (9), a conductor (18), connecting the finger (9) and the platform light (2) at the adjacent end of the car and a ground wire (19) leading from the platform light and grounded through the wheels of the car. The platform light circuit at the opposite end of the car is precisely like that just described.

A headlight circuit at each end of the car energized through the lamp circuit consists of the finger (11), a conductor (20) leading from the finger to the adjacent headlight (4) and a wire (21) connecting the headlight and the grounded wire (19). A reverse circuit at each end of the car similarly energized consists of the finger (12), and a conductor (22) leading from such finger to the headlight circuit at the opposite end of the car.

The operation of my invention is as follows: Assume that the car is to travel in the direction indicated by the arrow. The motorman upon starting out throws the reverse lever at the front end of the car from its "off" or intermediate position to its forward or "ahead" position to cause the car to travel forwardly, the speed of the car being regulated by means of the controller handle. The movement of the reverse lever partially rotates the reverse cylinder and in so doing brings section (15) of the contacts carried or otherwise actuated by the cylinder into engagement with the stationary finger (11) to energize the front headlight circuit and light the headlight. This circuit is traced as follows: The circuit enters the lamp wire (8) through supply wire (6) at which point the current branches. One portion of the current passes through the lamps (1), (1), in the front half of the car, thence into the contact finger (10), contact segment (13), contact section (15), contact finger (11), headlight conductor (20), headlight (4), and by way of wires (21) and (19) to the ground. Meanwhile the reverse cylinder at the rear end of the car is at its intermediate or "off" position at which time contact fingers (9') and (10') are in engagement with the contact section (14') and main segment (13') respectively on cylinder A'. A part of the current entering the car through the supply wire (6) passes along wire (8') and the lamps (1), (1), to the contact finger (10') at the rear end of the car, into main contact segment (13') on the rear reverse cylinder (A') into contact section (14'), contact finger (9'), conductor (18'), rear platform light (3), and wire (19') to the ground. Thus it will be seen that when moving forward, the car lamps, and the front headlight (4) are lighted. The front platform light is extinguished owing to the open circuit between finger (9) and contact section (14). Assuming that it becomes necessary to reverse the power to cause the car to run backward, the motorman will swing his reverse lever at the front end of the car from its forward or "ahead" position to its rearward or "back" position passing the "off" or intermediate position in its swing. The long main segment (13) will remain in engagement with the contact finger (10), contact section (14) will first engage and then pass from beneath finger (9) and substantially simultaneously with the disengagement of section (14) with finger (9), the reverse circuit section (16) will engage the finger (12). The current then passes through the lamps (1), (1) at the front end of the car via wire (8), contact finger (10), segment (13), conductor (17), section (16), finger (12), and conductor (22) to the rear headlight conductor (20'), rear headlight (5), and wires (21') and (19') to the ground. The rear headlight is thus automatically lighted when the car is backing up, the front headlight being extinguished. The lighting of the rear headlight under these circumstances serves to warn a car following, that the car in front is backing up. It also enables the conductor on the rear platform to watch the track. The switch (7) is thrown open when the lighting system is not required, as in daytime for instance or when the car is in the barn. It will be observed that so long as the switch (7) is closed the cylinders A and A' may occupy any of their three positions without cutting out the car lamps (1), (1). The motorman while maintaining control of the headlight and platform light circuits is not required to do any extra work such as turning a switch on or off, but the results desired are attained in the usual course of current control. Neither is there any danger of the lamp circuit burning out owing to arcing or short circuiting between the fingers and their contact segments, because the lamp circuit finger (10) is always in engagement with its segment (13) and the current is led into the lamp circuit before it is led to the reverse cylinder contacts. Furthermore, the contacts on the cylinder are so arranged relative to the fingers that the circuit is never broken between the supply wire (6) and the ground, one of the fingers (9), (11) or (12) always being in engagement with its respective segment.

It will be understood that the lighting system herein described is independent of the power circuit. Also, that the contacts may be otherwise located apart from the reverse cylinder providing they are arranged to operate automatically and coincidently with the operation of the reverse cylinder. The fingers instead of being stationary may be movable relative to a series of corresponding fixed contact sections and other changes might be made in the form and arrangement of the several parts described without departing from the spirit and scope of my invention.

Having thus fully disclosed my invention, what I claim as new is:—

1. The combination with a car or train having a headlight at each end, of a power controller having a reverse cylinder for causing the car to travel forward or backward, and electrical means automatically energized through the movement of the reverse cylinder for lighting either headlight depending upon the direction in which the car is to travel.

2. The combination with a car or train having a headlight at each end, and a power controller having a reverse cylinder capable of controlling the forward or backward movement of the car or train, of separate circuits for the respective headlights, one or the other of the headlight circuits being energized synchronously with the movement of the reverse cylinder.

3. The combination with an electrically propelled vehicle having a headlight at each end, and a cylinder for reversing the direction of the current, of separate headlight circuits controlled by the movement of the reverse cylinder to forward or backward position to light the front or back headlight respectively.

4. The combination with an electrically propelled vehicle having a headlight at each end, and a cylinder for reversing the direction of the power current, of a circuit for each headlight, and make and break devices controlled by the movement of the reverse cylinder from forward to backward position and vice versa to light the front or back headlight respectively.

5. A headlight system for cars, comprising a headlight at each end of the car, a main lighting circuit, a single reverse cylinder in the main lighting circuit, a make and break device controlled by the movement of the reverse cylinder, the main lighting circuit being branched at the make and break device, the branch circuits including the respective headlights, the operation of the reverse cylinder adapted to close one branch circuit and open the remaining branch circuit accordingly as the car is to be propelled forward or backward.

6. A headlight system for cars, comprising a headlight at each end of the car, a main lighting circuit, a single reverse cylinder, a make and break switch having at least three poles and controlled by the movement of the cylinder, the main lighting circuit in constant contact with one pole of the switch, separate lamp circuits including the respective head lights, the lamp circuits connected to the remaining poles respectively of the switch, the operation of the reverse cylinder adapted to connect one lamp circuit with the main lighting circuit and break the connection between the remaining lamp circuit and the main lighting circuit accordingly as the car is to be propelled forward or backward.

7. A lighting system for cars comprising a headlight at each end of the car, a power controller having a reverse cylinder, a lamp circuit, a source of electricity connected with the lamp circuit, a headlight circuit for each headlight, and make and break devices controlled by the movement of the reverse cylinder for making and breaking a connection between the lamp circuit and one or the other of the headlight circuits.

8. A car lighting system comprising headlights and platform lights at opposite ends of the cars, a lamp circuit, a source of electricity directly connected with the lamp circuit a power controller having a reverse cylinder, separate headlight and platform light circuits, a make and break device controlled by the movement of the reverse cylinder for making and breaking connections between the headlight circuits and the lamp circuit respectively, according as the car is to be propelled forward or backward, and a similarly controlled make and break device for maintaining a connection between the rear platform light circuit and the lamp circuit when the car is to be propelled forwardly.

9. A car lighting system comprising a lamp circuit adapted to be directly connected with a suitable electrical source, headlights at opposite ends of the car, a headlight circuit for each headlight, a power controller having a reverse cylinder for reversing the direction of the power current, and make and break devices controlled by the reverse cylinder for connecting one or the other of the headlight circuits with the lamp circuit according as the car is to be propelled forward or backward, and maintaining the lamp circuit closed during the making and breaking of the headlight circuits.

10. A car lighting system comprising a lamp circuit in direct communication with an electrical source, a power controller having a reverse cylinder for reversing the direction of the power current, a contact finger in which one end of the lamp circuit terminates, a contact segment in constant engagement with the finger, platform light, headlight and reverse circuits, fingers in which one end of each of the platform light, headlight and reverse circuits terminates, contact sections connected with the contact segment, the sections controlled by the movement of the reverse cylinder and so arranged relative to each other as to make and break connection with the headlight circuit, the platform light circuit and the reverse circuit respectively, and a grounded conductor with which the platform and headlight circuits are connected.

11. A car lighting system comprising a lamp circuit in direct communication intermediate its ends with a source of electricity, lamps on each side of such communication, a reverse cylinder, a headlight and a platform light at opposite ends of the car, the reverse cylinders each having three positions to reverse the direction of the power current and to cut off the power current, contact sections movable synchronously with each reverse cylinder and arranged respectively in positions corresponding to the three positions of the cylinders, fingers constituting the lamp circuit terminals, contact segments with which the fingers are in constant engagement, a platform light circuit, a headlight circuit and a reverse circuit for each cylinder, separate fingers in which one end of each of the platform light, headlight and reverse circuits terminate, and grounded conductors in which the opposite ends of the headlight, and platform light circuits at the respective ends of the car terminate, the remaining terminals of the reverse circuits connected to the headlight circuits at the opposite ends of the car respectively, the contact sections adapted to successively engage the headlight, platform light and reverse circuit fingers respectively as one or the other of the reverse cylinders is moved to forward, intermediate or backward position and being in electrical connection with the respective main contact segments.

12. A car lighting system comprising a platform light, a power controller comprising a reverse cylinder for reversing the direction of the power current, a lamp circuit directly connected with an electrical source, a platform light circuit independent of the lamp circuit, one terminal of the platform light circuit being grounded and make and break devices controlled by the movement of the reverse cylinder for making and breaking connection between the lamp circuit and the platform light circuit.

13. A car lighting system comprising a lamp circuit directly connected with a source of electrical energy, headlights at opposite ends of the car, a headlight circuit for each headlight, one terminal of each headlight circuit being grounded, a power controller comprising a reverse cylinder for reversing the direction of the power current, and make and break devices controlled by the movement of the reverse cylinder for making and breaking connection between the lamp circuit and the respective headlight circuits according as the car is to be propelled forward or backward.

14. A car lighting system comprising means for controlling the application of power to operate the car in a forward or backward direction, headlights at opposite ends of the car and a switch adapted to be operated by the controlling means for closing or opening an electrical circuit through one or the other of said headlights accordingly as the power is applied to operate the car in one direction or the other.

15. A car lighting system comprising a suitably energized lamp circuit, separate lights, a lighting circuit for each light, the lighting circuits being independent of each other, a single means for reversing the power to propel the car in opposite directions, and make and break devices controlled by the movement of such reversing means to connect one or the other of the respective lighting circuits with the lamp circuit, accordingly as power is applied to propel the car forward or backward.

16. A car lighting system comprising a main lighting circuit, lamp circuits, a headlight in each lamp circuit, a balancing light circuit for each lamp circuit, lights in the respective balancing circuits, reversing cylinders for reversing the power to propel the car forward or backward or cut out the power, and make and break devices interposed between and connected to the main lighting circuit and to both lamp circuits and to a balancing light circuit respectively, the make and break devices being controlled by the movement of their respective reversing cylinders for connecting one or the other of the lamp circuits with the main lighting circuit and simultaneously disconnecting one of the balancing light circuits relative to the main lighting circuit accordingly as power is applied to propel the car in one direction or the other, and for cutting in its respective balancing circuit and simultaneously cutting out one or the other of the lamp circuits when the power is off.

17. A headlight system comprising a headlight at each end of the car, a lighting circuit including one of the headlights, a reverse circuit branching from the lighting circuit, the other headlight included in such reverse circuit, a single power controller having a reverse cylinder and a make and break device movable synchronously with the reverse cylinder and located at the juncture of the reverse circuit with the lighting circuit for closing one circuit and opening the other accordingly as the car is to be propelled forward or backward.

18. A car lighting system comprising a suitably energized branched lighting wire, lamps on each branch, a headlight at each end of the car, headlight circuits connected to the respective headlights, a make and break device located between each branch lighting wire and its headlight circuit, cylinders for reversing the power to propel the car in the opposite directions, the cylinders controlling the make and break devices to connect one or the other of the headlight circuits with its respective branch lighting wire, and reverse conductors extending from one make and break device to the opposite headlight circuit to energize the headlight at the rear end of the car, when the car is propelled backward.

19. A car lighting system comprising a suitably energized lighting wire, a headlight at each end of the car, a headlight circuit for each headlight, a platform light, a platform light circuit for the platform light, means for reversing the power to propel the car in opposite directions, a make and break device controlled by the movement of such reversing means for connecting one or the other of the headlight circuits with the lighting wire accordingly as power is applied to propel the car forward or backward and to cut in or out the platform light circuit with relation to the lighting wire accordingly as the reversing means is at its intermediate position or not.

In testimony whereof I affix my signature in presence of two witnesses.

EDWARD C. FOLSOM.

Witnesses:
CHARLES D. SHAW, Jr.,
HARRY S. STEELE.